(12) United States Patent
Gundlach

(10) Patent No.: US 10,543,987 B2
(45) Date of Patent: Jan. 28, 2020

(54) CONVEYOR BELT AND MODULE WITH SKEWED AIR-FLOW PASSAGES

(71) Applicant: Laitram, L.L.C., Harahan, LA (US)

(72) Inventor: James O. Gundlach, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/066,266

(22) PCT Filed: Jan. 6, 2017

(86) PCT No.: PCT/US2017/012501
§ 371 (c)(1),
(2) Date: Jun. 26, 2018

(87) PCT Pub. No.: WO2017/127244
PCT Pub. Date: Jul. 27, 2017

(65) Prior Publication Data
US 2019/0202637 A1 Jul. 4, 2019

Related U.S. Application Data

(60) Provisional application No. 62/280,461, filed on Jan. 19, 2016.

(51) Int. Cl.
*B65G 15/30* (2006.01)
*B65G 69/20* (2006.01)

(52) U.S. Cl.
CPC ........... *B65G 15/30* (2013.01); *B65G 69/20* (2013.01)

(58) Field of Classification Search
None
See application file for complete search history.

(56) References Cited

U.S. PATENT DOCUMENTS

| | | | |
|---|---|---|---|
| 4,742,907 A * | 5/1988 | Palmaer | B65G 17/068 198/831 |
| 4,821,872 A | 4/1989 | Lapeyre | |
| 4,828,434 A | 5/1989 | Fairman et al. | |
| 4,832,187 A | 5/1989 | Lapeyre | |
| 5,213,203 A * | 5/1993 | Kinney | B65G 17/08 198/834 |
| 5,253,749 A * | 10/1993 | Ensch | B65G 17/08 198/834 |
| 5,407,563 A | 4/1995 | Blake | |
| 5,448,898 A * | 9/1995 | Rothstein | C07D 241/38 62/380 |
| 5,651,191 A * | 7/1997 | Walunas | F26B 3/082 198/952 |
| 6,193,056 B1 * | 2/2001 | van Zijderveld | B65G 17/08 198/853 |
| 6,499,587 B1 | 12/2002 | Greve | |

(Continued)

FOREIGN PATENT DOCUMENTS

EP 1258461 A2 11/2002
WO 2014057170 A1 4/2014

*Primary Examiner* — William R Harp
(74) *Attorney, Agent, or Firm* — James T. Cronvich

(57) ABSTRACT

A conveyor belt and a belt module having airflow passages that direct air exiting the module in different directions to agitate conveyed products. The airflow passages of injection-molded belt modules are formed with no undercut regions to accommodate the clean parting of the mold halves.

12 Claims, 2 Drawing Sheets

(56) References Cited

U.S. PATENT DOCUMENTS

| | | | |
|---|---|---|---|
| 6,698,582 B2 * | 3/2004 | Niemela | B65G 15/48 198/844.1 |
| 7,364,036 B2 * | 4/2008 | Schoepf | B65G 17/08 198/850 |
| 7,575,113 B2 | 8/2009 | Sedlacek et al. | |
| 2007/0181408 A1 | 8/2007 | Schoepf | |

* cited by examiner

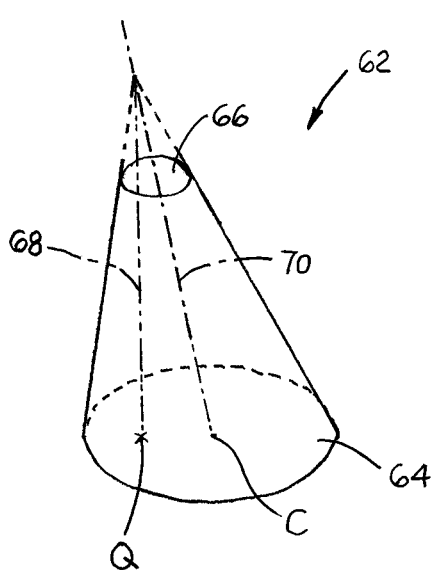
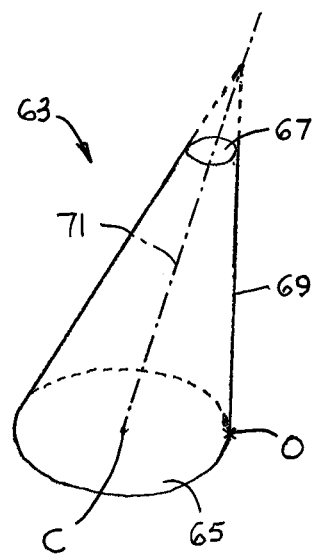
FIG. 4
FIG. 5
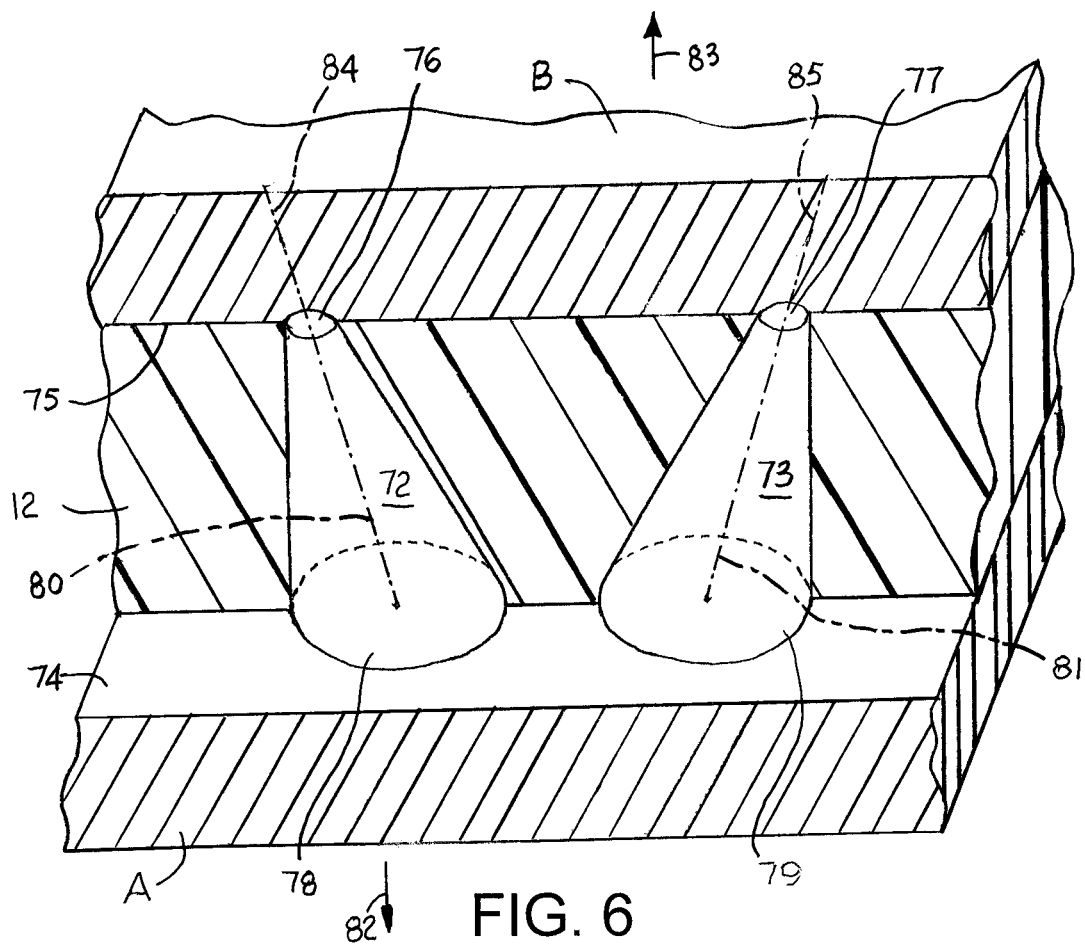
FIG. 6

CONVEYOR BELT AND MODULE WITH SKEWED AIR-FLOW PASSAGES

BACKGROUND

The invention relates generally to power-driven conveyors and more particularly to conveyor belts and modules with skewed airflow passages.

Fruits, vegetables, and other food products to be frozen are transported through freezer chambers by conveyor belts. Pressurized, chilled air is forced through passages in the conveyor belt and into the conveyed product bed. The products freeze during their dwell time in the freezer. Conventional conveyor belts have passages that direct the chilled air perpendicular to the plane of the belt, e.g., vertically on a horizontal belt run. Because all or almost all the chilled air flows through the belt in the same direction with little agitation, the products are not consistently uniformly frozen.

SUMMARY

One version of a conveyor belt embodying features of the invention comprises a plurality of tapered passages extending from openings at an upper conveying side to openings at an opposite lower side. Each tapered passage has a centroidal axis. Extensions of the centroidal axes of the tapered passages extend in a plurality of directions from the openings.

In another aspect a conveyor belt module comprises a first end having first hinge elements defining a first hinge axis and an opposite second end having second hinge elements defining a second hinge axis. The first and second hinge axes lie in a common plane. Passages extend from an upper side to a lower side of the module. Each passage is bounded by a wall defining a portion of an oblique cone or pyramid having a base parallel to the common plane, a height perpendicular to the base, and an oblique centroidal axis. The height and the oblique centroidal axis intersect the base at different points, and extensions of the oblique centroidal axes extend from the passages in a plurality of directions.

Another version of a conveyor belt module comprises an upper side and a lower side opposite the upper side through the module's thickness. Passages extend without undercuts from first openings at the upper side to second openings at the lower side. The passages are tapered to direct air exiting the first openings at the upper side in different directions.

BRIEF DESCRIPTION OF THE DRAWINGS

FIG. 4 is an oblique view of an oblique conical mold feature used to injection-mold a belt module as in FIG. 2;

FIG. 5 is an oblique view of another version of an oblique conical mold feature used to injection-mold a belt module as in FIG. 2; and FIG. 6 is an oblique cross section of a portion of a belt module as in FIG. 2 during injection molding.

DETAILED DESCRIPTION

Figure 1:
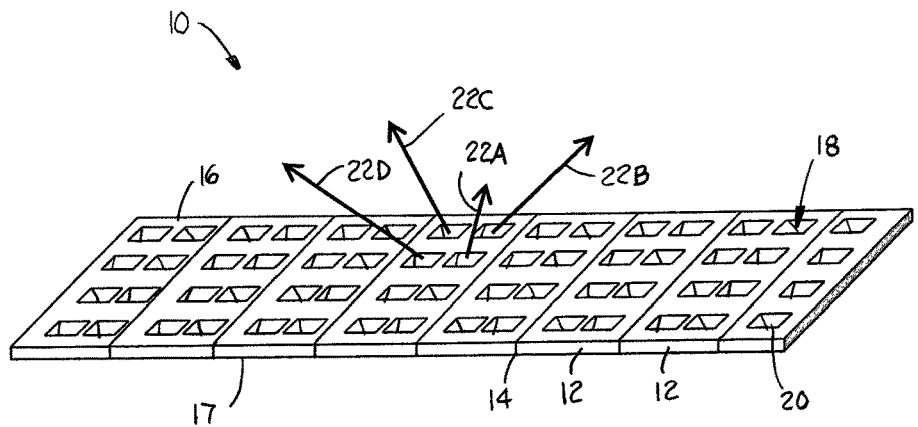
FIG. 1 is an oblique schematic view of a portion of a conveyor belt embodying features of the invention.

A portion of a conveyor belt embodying features of the invention is shown in FIG. 1. The conveyor belt 10 is a modular conveyor belt constructed of a series of rows of one or more belt modules 12 joined end to end at hinge joints 14 between adjacent rows. The conveyor belt 10 has an upper conveying side 16 and an opposite lower side 17. Passages 18 extend through the thickness of the modules 12 and open onto the conveying side 16 at upper openings 20 and onto the lower side 17 at lower openings (not visible in FIG. 1). The passages 18 are skewed to direct cooling air in different, skewed directions as it flows out the openings 20, as indicated by the arrows 22A-22D. The differently directed jets of air exiting each passage 18 tend to better fluidize a bed of foodstuffs, resulting in more uniform freezing of individual particles with little clumping. (To simplify the drawing and the description, the passages 18 are shown relatively larger in size and fewer in number in FIG. 1 than in an actual belt.)

Figure 2:
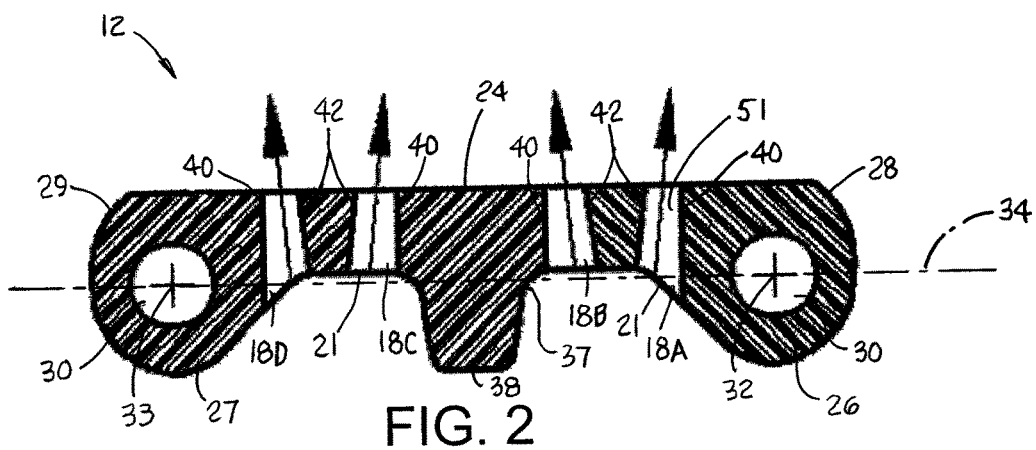
FIG. 2 is a cross section of a belt module usable in a conveyor belt as in FIG. 1.

A conveyor belt module 12 usable to construct a conveyor belt as in FIG. 1 is shown in FIG. 2. The conveyor belt module 12 is injection-molded out of a thermoplastic polymer. The module 12 has an intermediate portion 24 and hinge elements 26, 27 at opposite first and second ends 28, 29. Gaps separate the hinge elements 26, 27 along each end 28, 29 so that the hinge elements of adjacent modules can be interleaved—the hinge elements of one module residing in the gaps of the adjacent module. Lateral holes 30 through the interleaved hinge elements 26, 27 of adjacent modules are aligned to form a lateral passageway for a hinge rod (not shown). The hinge rods define hinge axes 32, 33 about which adjacent rows of belt modules 12 can articulate. The hinge axes 32, 33 of each belt module 12, or belt row, lie in a common plane 34. In this example the module 12 has an upper conveying side 36 that is parallel to the common plane 34. An opposite lower side 37 has portions that are parallel to the common plane and other portions, such as at the hinge elements 26, 27 and at a drive bar or impact absorber 38, that are not. (The terms "upper" and "lower" are used to define the opposite sides in reference to a belt that is conveying products on a horizontal carryway—the most common application. But those terms are not meant to limit the claims to belts operated in that particular orientation.)

The cross section of the belt module 12 in FIG. 2 cuts through four passages 18A-18D that extend through the thickness of the module and open onto the upper and lower sides 36, 37. In this example one side of each passage 18A-18D is shown as a vertical line 40, i.e., a line perpendicular to the common plane 34. The sides 42 of the passages opposite the vertical lines 40 are all not perpendicular to the common plane 34. Instead, they are angled at oblique, non-right angles. The angled sides direct the air entering openings 21 at the lower side 37 to exit the openings 20 at the upper side 36 at an oblique angle relative to the common plane 34 and in different directions. As shown in FIG. 2, the non-vertical sides 42 of neighboring passages angle in opposite directions from a vertical line to direct jets of air in a plurality of different directions as indicated by the arrows. Although only two different directions are shown in the two-dimensional cross section of FIG. 2, the module's other passages, not visible in this cross section, would include passages angled in different directions from those shown to direct air exiting the module in directions other than the two directions indicated by the arrows.

Figure 3:
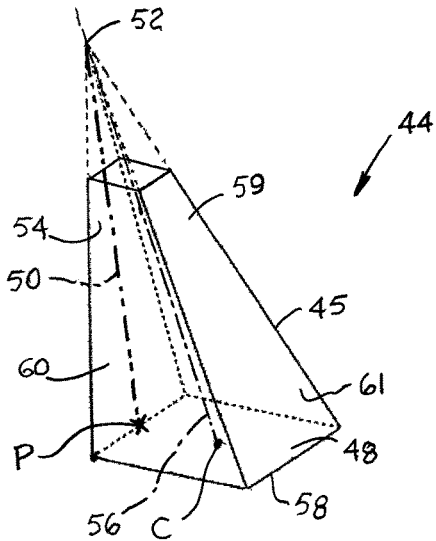
FIG. 3 is an isometric view of a pyramidal mold feature used in injection molding a belt module as in FIG. 2.

One way to form the tapered passages 18 in an injection-molded belt module 12 as in FIG. 2 is with a tapered feature 44 in a mold as in FIG. 3. The mold feature 44 is a portion of an oblique, four-sided pyramid 45, which has a base 48 at the mold wall and a height 50 perpendicular to the base. (The height of an oblique pyramid does not intersect the center of the base.) The height 50 extends from the base 48 to the imaginary apex 52 of the truncated pyramid 45. The oblique pyramid 45 has a centroidal axis 56 between the center C of the base 48 and the apex 52. In this version the height 50 lies on the perimeter 58, or directrix, of the pyramid's base 48 at a point P that is not the center C of the base. Because the height 50 intersects the perimeter 58 of the pyramid's base 48, the vertical face 54 of the mold feature 44 forms the vertical side 40 of the walls bounding the passages 18 in the module 12 of FIG. 2. And the opposite slanted face 59 forms the slanted opposite side 42 of the passages 18. Like the vertical face 54 of the mold feature 44, the connecting faces 60, 61 are also vertical in this version. But the connecting faces could be tapered inward off vertical toward the apex. Thus, the oblique pyramidal mold feature 44 forms the tapered passages 18 in the module 12 of FIG. 2, in which each passage is bounded by a closed, four-sided pyramidal wall 51. Because the feature 44 is formed on one mold half and is parted from the other mold half in a direction perpendicular to the common plane 34 and because the height of the pyramid intersects the base 48, no undercut that prevents clean separation of the mold halves is formed in the module. So manufacturing of such a module by injection molding is straightforward.

Other versions of mold features are shown in FIGS. 4 and 5. The features 62, 63 are oblique cones, which form closed, curved walls bounding the tapered passages 18 in the belt module 12 of FIG. 2. In both these versions the cross sections of the cones are circular from the bases 64, 65 to the truncated tops 66, 67. But the cone could be tapered to provide oval, elliptical, or other curved cross sections whose perimeters decrease, and not necessarily linearly, from the bases 64, 65 to the tops 66, 67. So the term "cone" is used in a broader sense than its strict mathematical sense, in which a cone's surface decreases linearly from base to apex. In the mold feature 63 of FIG. 5, the height 69 intersects the perimeter of the base 65 at a point O. In the mold feature 62 of FIG. 4, the height 68 intersects the base 64 in its interior at a point Q. For that reason no undercut is formed in the module passages formed by either mold feature 62, 63. In both cases the heights 68, 69 do not coincide with the centroidal axes 70, 71 so that the conical mold features 62, 63 form oblique passages through the thickness of the belt modules.

FIG. 6 shows the formation of a portion of the conveyor belt module 12 in a mold. The mold has two halves A, B. Two oblique conical mold features 72, 73, which are like that of FIG. 5, extend upward from the inner face 74 of the mold half A. The truncated tops 76, 77 of the conical features 72, 73 contact the inner face 75 of the mold half B. The molten thermoplastic polymer is injected into the mold cavity between the two joined halves A, B. Heat and pressure are applied to cure the polymer and form the module 12. The truncated cones 72, 73 form each tapered airflow passage in the module 12 with a closed, curved wall and a smaller opening at the side formed by the truncated tops 76, 77 and a larger opening formed at the bases 78, 79 of the cones 72, 73. The differently directed centroidal axes 80, 81 of the oblique cones 72, 73 form neighboring tapered passages in the module 12 that divert the airflow in different directions along extensions 84, 85 of the centroidal axes 80, 81 from the upper openings. The centroidal axes of adjacent passages may be coplanar, as shown, or skewed. The two mold halves A, B part easily along lines 82, 83 because the oblique conical mold features form no undercut regions in the belt module 12.

Although the invention has been described in detail with respect to a few versions, other versions are possible. For example, the pyramidal passages were described as four-sided with rectangular cross sections. But passages could be formed with triangular, pentagonal, or other polygonal cross sections. As another example, oblique airflow passages could be combined with non-oblique passages that direct air perpendicular to the common plane of the modules.

What is claimed is:

1. A conveyor belt comprising:
    an upper conveying side and a lower side opposite the conveying side;
    a plurality of tapered passages extending from openings at the conveying side to openings at the lower side, wherein each tapered passage has a centroidal axis;
    wherein extensions of the centroidal axes of the tapered passages extend in a plurality of directions from the openings;
    wherein the extensions of the centroidal axes of neighboring tapered passages extend in different directions.

2. A conveyor belt as in claim 1 wherein the openings at the conveying side are smaller than the openings at the lower side.

3. A conveyor belt as in claim 1 wherein each tapered passage is bounded by a wall defining a portion of an oblique pyramid or an oblique cone having a base and a height, wherein the height and the centroidal axis intersect the base at different points.

4. A conveyor belt as in claim 3 wherein the height intersects the base at the perimeter of the base.

5. A conveyor belt as in claim 3 wherein the wall defines a portion of an oblique pyramid having four sides.

6. A conveyor belt as in claim 3 wherein the wall defines a portion of an oblique cone having a circular cross section.

7. A conveyor belt module comprising:
    a first end having first hinge elements defining a first hinge axis;
    an opposite second end having second hinge elements defining a second hinge axis,
        wherein the first and second hinge axes lie in a common plane;
    an upper side;
    a lower side;
    a plurality of passages extending from the upper side to the lower side, wherein each passage is bounded by a wall defining a portion of an oblique cone or pyramid having a base parallel to the common plane, a height perpendicular to the base, and an oblique centroidal axis, wherein the height and the oblique centroidal axis intersect the base at different points;
    wherein extensions of the oblique centroidal axes extend from the passages in a plurality of directions; and
    wherein the extensions of the oblique centroidal axes of neighboring passages extend in different directions.

8. A conveyor belt module as in claim 7 wherein the height intersects the base at the perimeter of the base.

9. A conveyor belt module as in claim 7 wherein the wall has four sides and defines a portion of an oblique pyramid.

10. A conveyor belt module as in claim 7 wherein the wall is a closed curved wall defining an oblique cone.

11. A conveyor belt module as in claim 10 wherein the cross section of the oblique cone in the passage is circular.

12. A conveyor belt module as in claim 7 wherein the passages open onto the upper side at first openings and onto the lower side at second openings wherein the first openings are smaller than the second openings.

\* \* \* \* \*